(12) United States Patent
Wang et al.

(10) Patent No.: US 12,482,527 B2
(45) Date of Patent: Nov. 25, 2025

(54) APPARATUS AND METHODS FOR READ RETRY WITH CONDITIONAL DATA REFRESH

(71) Applicant: Sandisk Technologies, Inc., Milpitas, CA (US)

(72) Inventors: Ming Wang, Shanghai (CN); Liang Li, Shanghai (CN); Yichen Wang, Shanghai (CN); Wei Li, Shanghai (CN); Jiahui Yuan, Fremont, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 212 days.

(21) Appl. No.: 18/533,110

(22) Filed: Dec. 7, 2023

(65) Prior Publication Data

US 2025/0191663 A1  Jun. 12, 2025

(51) Int. Cl.
*G11C 7/00* (2006.01)
*G06F 3/06* (2006.01)
*G11C 11/56* (2006.01)
*G11C 16/04* (2006.01)
*G11C 16/26* (2006.01)
*G11C 16/34* (2006.01)

(52) U.S. Cl.
CPC ........ *G11C 16/3431* (2013.01); *G06F 3/0613* (2013.01); *G06F 3/0659* (2013.01); *G06F 3/0679* (2013.01); *G11C 11/5642* (2013.01); *G11C 11/5671* (2013.01); *G11C 16/0483* (2013.01); *G11C 16/26* (2013.01)

(58) Field of Classification Search
CPC ....... G11C 7/1051; G11C 7/22; G11C 7/1006; G11C 7/1066; G11C 7/1072
USPC ...................................................... 365/189.15
See application file for complete search history.

(56) References Cited

U.S. PATENT DOCUMENTS

| | | | |
|---|---|---|---|
| 9,318,215 B2 | 4/2016 | Desireddi et al. | |
| 10,991,444 B1 | 4/2021 | Bazarsky et al. | |
| 11,557,352 B2 | 1/2023 | Chen et al. | |
| 2018/0046527 A1 | 2/2018 | Reusswig et al. | |
| 2018/0074894 A1* | 3/2018 | Sakurada | G11C 16/10 |
| 2018/0197619 A1 | 7/2018 | Chen et al. | |
| 2023/0012648 A1* | 1/2023 | Fitzpatrick | G11C 29/42 |

* cited by examiner

*Primary Examiner* — Son T Dinh
(74) *Attorney, Agent, or Firm* — PEARL COHEN ZEDEK LATZER BARATZ LLP

(57) ABSTRACT

An apparatus includes a memory structure including non-volatile memory cells, and a control circuit coupled to the memory cell. The control circuit configured to first read a block of non-volatile memory cells using a first plurality of read levels, determine that the first read fails to successfully read the block of non-volatile memory cells, second read the block of memory cells using a second plurality of read levels different from the first plurality of read levels, determine that the second read successfully reads the block of non-volatile memory cells, estimate that the first read failed because of data retention or read disturb, and erase and re-write data to the block of non-volatile memory cells.

20 Claims, 13 Drawing Sheets

APPARATUS AND METHODS FOR READ RETRY WITH CONDITIONAL DATA REFRESH

BACKGROUND

Semiconductor memory is widely used in various electronic devices such as cellular telephones, digital cameras, personal digital assistants, medical electronics, mobile computing devices, servers, solid state drives, non-mobile computing devices and other devices. Semiconductor memory may be non-volatile memory or volatile memory. A non-volatile memory allows information to be stored and retained even when the non-volatile memory is not connected to a source of power (e.g., a battery).

BRIEF DESCRIPTION OF THE DRAWINGS

Like-numbered elements refer to common components in the different figures.

DETAILED DESCRIPTION

Technology is described for reading a block of non-volatile memory cells of a memory array after an initial read failure. The block of memory cells is read a first time using a first set of read parameters. In an embodiment, the non-volatile memory cells are multi-level memory cells. In an embodiment, the first set of read parameters include read levels for distinguishing between threshold voltages of the block of non-volatile memory cells.

In an embodiment, after the initial read failure the first set of read parameters are modified to create a second set of read parameters to attempt to successfully read the block of non-volatile memory cells. The second set of read parameters is different than the first set of read parameters. In an embodiment, the first set of read parameters include read levels for distinguishing between threshold voltages of the block of non-volatile memory cells. In an embodiment, the block of memory cells is read a second time using the second set of read parameters, and the second read successfully reads the block of non-volatile memory cells.

In an embodiment, a determination is made that the first read failure was likely caused by data retention or read disturb. In an embodiment, an estimation is made that the first read failure was likely caused by data retention or read disturb. In an embodiment, a prediction is made that the first read failure was likely caused by data retention or read disturb.

In embodiments, the determination/estimation/prediction is based on differences between the first set of read parameters and the second set or read parameters. In an embodiment, the determination, estimation, prediction is based on differences between a first set of read levels and a second set of read levels. In an embodiment, the determination/estimation/prediction is based on a first difference between a first read level and a second read level exceeding a first threshold, or a second difference between a third read level and a fourth read level exceeding a second threshold.

In an embodiment, following the determination/estimation/prediction that the first read failure was likely caused by data retention or read disturb the block of memory cells is re-written. In an embodiment, following the determination/estimation/prediction that the first read failure was likely caused by data retention or read disturb the block of memory cells is erased and re-written. In an embodiment, following the determination/estimation/prediction that the first read failure was likely caused by data retention or read disturb the block of memory cells is flagged and subsequently re-written as a background operation.

Figure 1A:
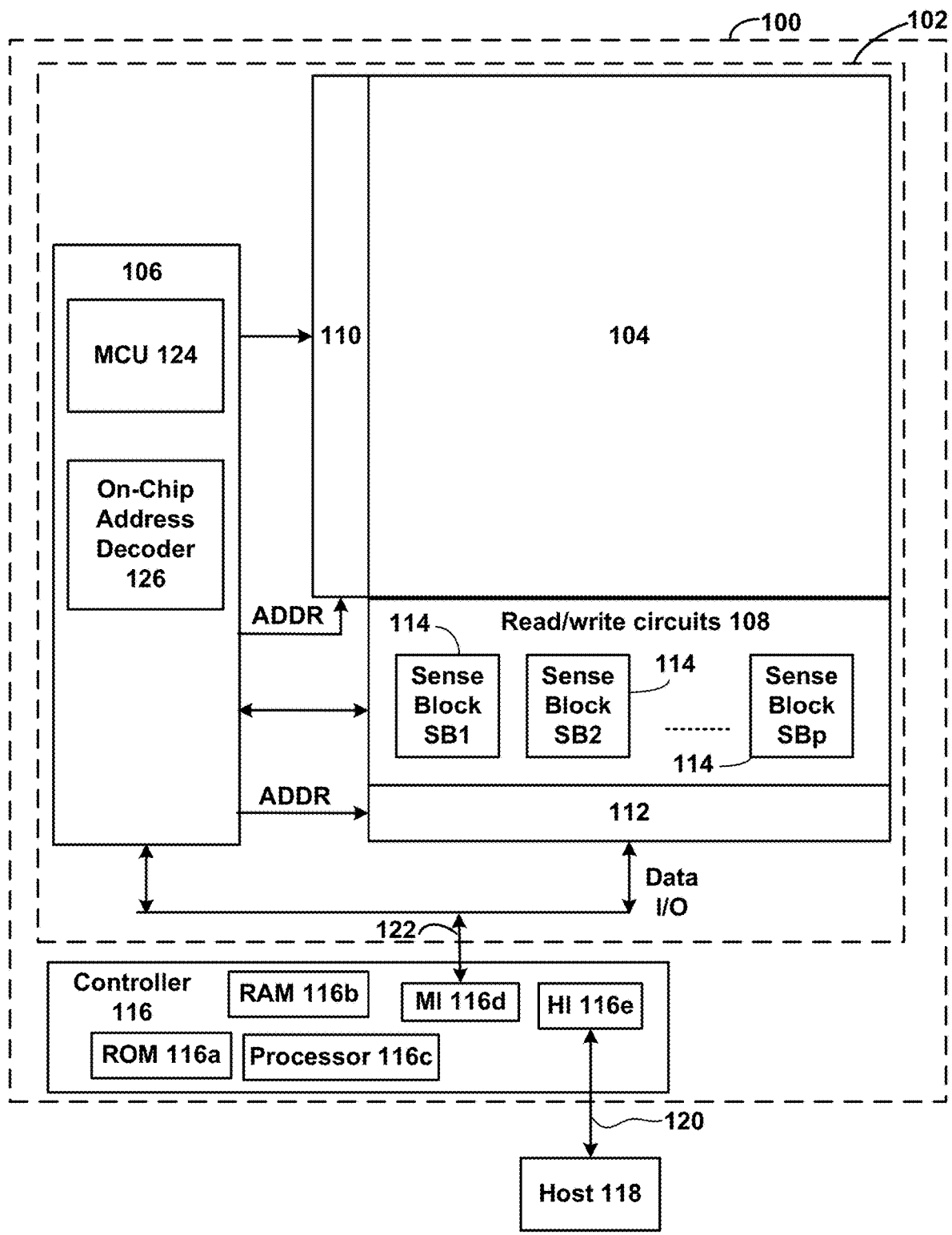
FIG. 1A is a functional block diagram of a memory device.
Figure 1B:
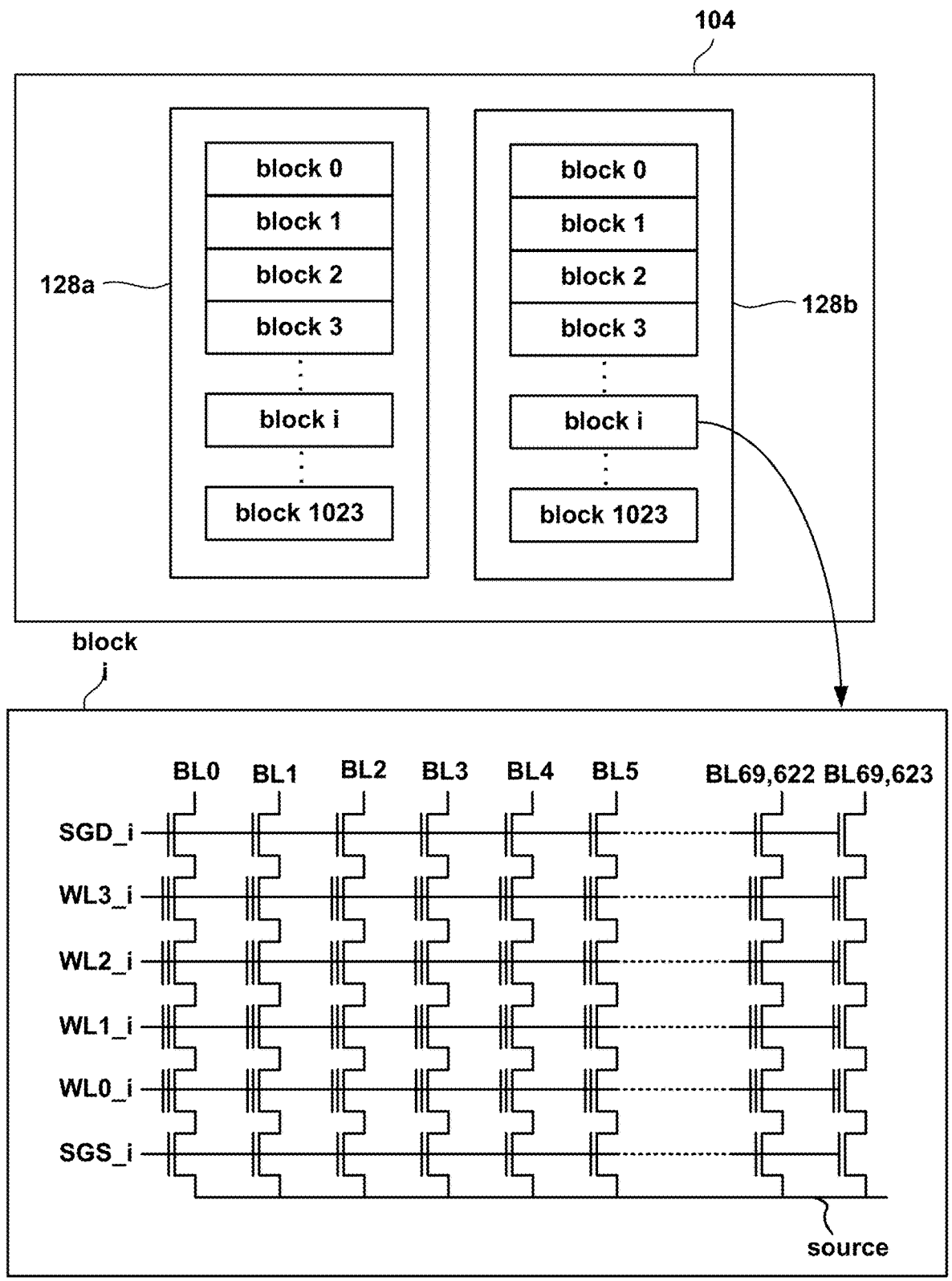
FIG. 1B is a block diagram depicting one example of a memory structure.
Figure 1C:
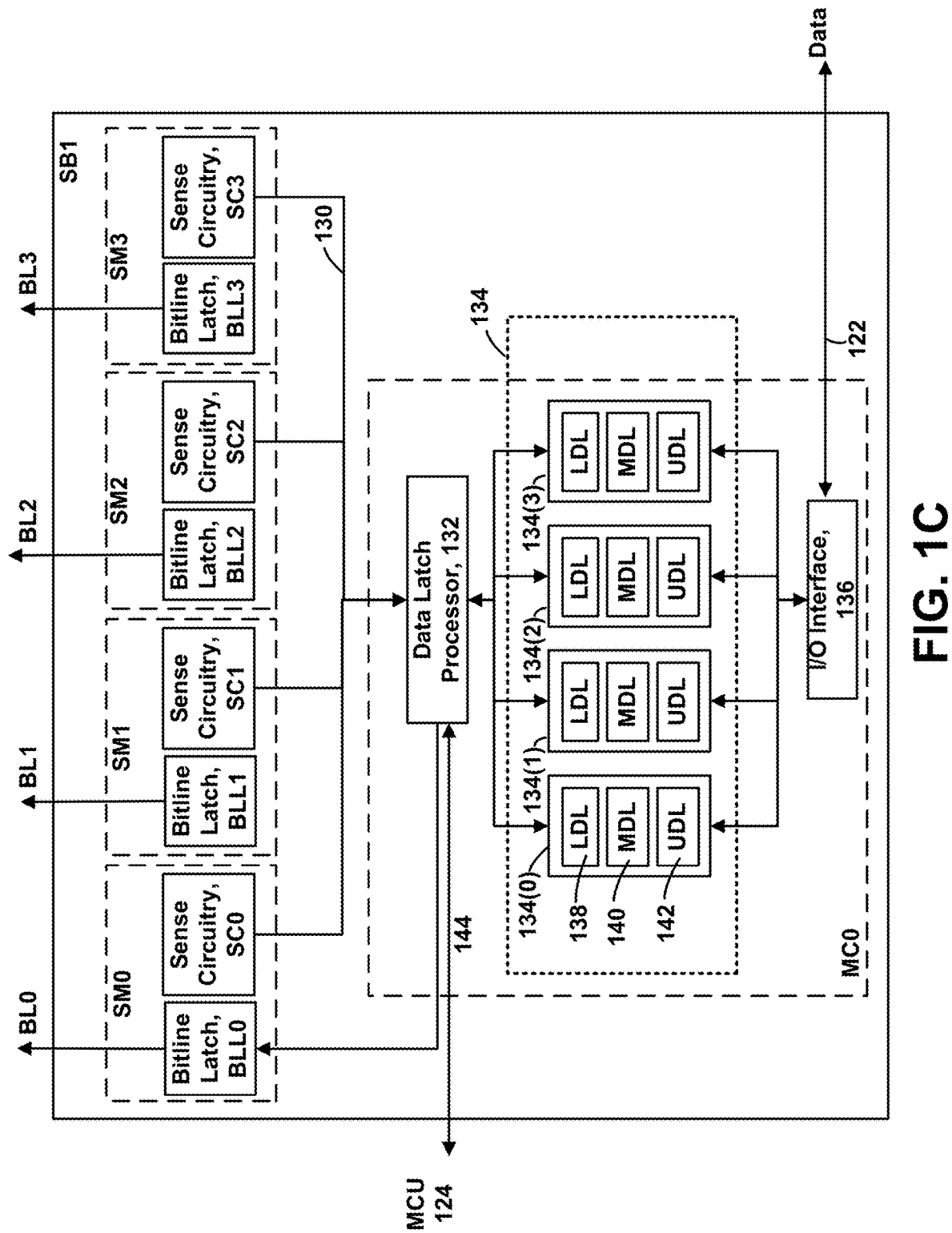
FIG. 1C is a block diagram depicting one embodiment of a sense block of FIG. 1A.

FIGS. 1A-1C describe examples of a memory system that can be used to implement the technology described herein. FIG. 1A is a functional block diagram of an example memory system 100. Memory system 100 includes one or more memory die 102.

In one embodiment, each memory die 102 includes a memory structure 104, control circuitry 106, and read/write circuits 108. Memory structure 104 is addressable by word lines via a row decoder 110 and by bit lines via a column decoder 112. Read/write circuits 108 include multiple sense blocks 114 including SB1, SB2, . . . , SBp (sensing circuitry) and allow a page of memory cells to be read or programmed in parallel.

In some systems, a controller 116 is included in the same package (e.g., a removable storage card) as the one or more memory die 102. However, in other systems, controller 116 may be separate from memory die 102. In some embodiments controller 116 may be on a different die than memory die 102.

In some embodiments, a single controller 116 will communicate with multiple memory die 102. In other embodiments, each memory die 102 has its own controller. Commands and data are transferred between a host 118 and controller 116 via a data bus 120, and between controller 116 and memory die 102 via lines 122. In one embodiment, memory die 102 includes a set of input and/or output (I/O) pins that connect to lines 122.

Control circuitry 106 cooperates with read/write circuits 108 to perform memory operations (e.g., write, read, and others) on memory structure 104, and includes a programmable and reprogrammable microcontroller (MCU) 124, an on-chip address decoder 126, and a power control circuit (not shown).

Microcontroller 124 provides die-level control of memory operations. In an embodiment, microcontroller 124 is programmable by software, and in other embodiments microcontroller 124 is completely implemented in hardware (e.g., electrical circuits). In an embodiment, control circuitry 106 includes buffers such as registers, ROM fuses and other storage devices for storing default values such as base voltages and other parameters.

On-chip address decoder 126 provides an address interface between addresses used by host 118 or controller 116 to the hardware address used by row decoder 110 and column decoder 112. The power control circuit controls the power and voltages supplied to the word lines and bit lines during memory operations, and may include charge pumps for creating voltages. Sense blocks 114 include bit line drivers.

Microcontroller 124 and/or controller 116 (or equivalently functioned circuits) can be considered a control circuit that performs the functions described herein. The control circuit can include hardware only or a combination of hardware and software. For example, a controller programmed by firmware to perform the functions described herein is one example of a control circuit. A control circuit can include a processor, Field Programmable Gate Array (FGA), Application Specific Integrated Circuit (ASIC), integrated circuit or other type of circuit.

In an embodiment, control circuitry 106 (including microcontroller 124), read/write circuits 108, decoders 110 and decoders 112 are positioned on a substrate underneath memory structure 104. As used herein, the term "Controller Circuit" may include one or more of control circuitry 106 (including microcontroller 124), read/write circuits 108, decoders 110 and decoders 112, or similar circuitry.

Controller 116 may include one or more processors 116c, ROM 116a, RAM 116b, a memory interface (MI) 116d and a host interface (HI) 116e, all of which are interconnected. The storage devices (ROM 116a, RAM 116b) store code (software) such as a set of instructions (including firmware), and one or more processors 116c are operable to execute the set of instructions to provide the functionality described herein.

Alternatively or additionally, one or more processors 116c can access code from a storage device in memory structure 104, such as a reserved area of memory cells connected to one or more word lines. RAM 116b can be to store data for controller 116, including caching program data (discussed below).

Memory interface 116d, in communication with ROM 116a, RAM 116b and processor 116c, provides an electrical interface between controller 116 and one or more memory die 102. For example, memory interface 116d can change the format or timing of signals, provide a buffer, isolate from surges, latch I/O, etc.

One or more processors 116c can issue commands to control circuitry 106 (or another component of memory die 102) via memory interface 116d. Host interface 116e provides an electrical interface with host 118 via data bus 120 to receive commands, addresses and/or data from host 118 to provide data and/or status to host 118.

In one embodiment, memory structure 104 includes a three dimensional memory array of non-volatile memory cells in which multiple memory levels are formed above a substrate, such as a wafer. Memory structure 104 may include any type of non-volatile memory that are monolithically formed in one or more physical levels of arrays of memory cells having an active area disposed above a silicon (or other type of) substrate. In one example, the non-volatile memory cells comprise vertical NAND strings with charge-trapping material.

In another embodiment, memory structure 104 includes a two dimensional memory array of non-volatile memory cells. In one example, the non-volatile memory cells are NAND flash memory cells utilizing floating gates. Other types of memory cells (e.g., NOR-type flash memory) also can be used.

The exact type of memory array architecture or memory cell included in memory structure 104 is not limited to the examples above. Many different types of memory array architectures or memory technologies can be used to form memory structure 104. No particular non-volatile memory technology is required for purposes of the new claimed embodiments proposed herein.

Other examples of suitable technologies for memory cells of memory structure 104 include ReRAM memories, magnetoresistive memory (e.g., MRAM, Spin Transfer Torque MRAM, Spin Orbit Torque MRAM), phase change memory (e.g., PCM), and the like. Examples of suitable technologies for memory cell architectures of memory structure 104 include two dimensional arrays, three dimensional arrays, cross-point arrays, stacked two dimensional arrays, vertical bit line arrays, and the like.

One example of a ReRAM, or PCMRAM, cross point memory includes reversible resistance-switching elements arranged in cross point arrays accessed by X lines and Y lines (e.g., word lines and bit lines). In another embodiment, the memory cells may include conductive bridge memory elements. A conductive bridge memory element also may be referred to as a programmable metallization cell.

A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity. The magnetization of the other plate can be changed to match that of an external field to store memory. A memory device is built from a grid of such memory cells.

Phase change memory (PCM) exploits the unique behavior of chalcogenide glass. One embodiment uses a GeTe—$Sb_2Te_3$ super lattice to achieve non-thermal phase changes by changing the co-ordination state of the Germanium atoms with a laser pulse (or light pulse from another source). The memory cells can be inhibited by blocking the memory cells from receiving the light.

A person of ordinary skill in the art will recognize that the technology described herein is not limited to a single specific memory structure, but covers many relevant memory structures within the spirit and scope of the technology as described herein and as understood by one of ordinary skill in the art.

FIG. 1B depicts an example of memory structure 104. In one embodiment, an array of memory cells is divided into multiple planes. For example, memory structure 104 is divided into two planes: plane 128a and plane 128b. In other embodiments, more or fewer than two planes may be used. In some embodiments, each plane is divided into a number of memory erase blocks (e.g., blocks 0-1023, or another amount).

In certain memory technologies (e.g., 2D/3D NAND and other types of flash memory), a block is the smallest unit of memory cells for an erase operation, and is sometimes referred to as an "erase block." That is, each erase block contains the minimum number of memory cells that are erased together in a single erase operation. Other units of erase also can be used. In other memory technologies (e.g., MRAM, PCM, etc.) used in other embodiments implementing the solution described herein, memory cells may be overwritten without an erase operation and so erase blocks may not exist.

Each erase block includes many memory cells. The design, size, and organization of an erase block depends on the architecture and design for the memory structure 104. As used herein, an erase block is a contiguous set of memory cells that share word lines and bit lines. For example, erase block i of FIG. 1B includes memory cells that share word lines WL0_i, WL1_i, WL2_i and WL3_i and share bit lines BL0-BL69,623.

In one embodiment, an erase block contains a set of NAND strings which are accessed via bit lines (e.g., bit lines BL0-BL69,623) and word lines (WL0, WL1, WL2, WL3). FIG. 1B shows four memory cells connected in series to form a NAND string.

Although four cells are depicted to be included in each NAND string, more or less than four can be used (e.g., 16, 32, 64, 128, 256 or another number or memory cells can be on a NAND string). One terminal of the NAND string is connected to a corresponding bit line via a drain select gate, and another terminal is connected to the source line via a source select gate. Although FIG. 1B shows 69624 bit lines, a different number of bit lines also can be used.

Each erase block and/or each memory storage unit is typically divided into a number of pages. In one embodiment, a page is a unit of programming/writing and a unit of reading. Other units of programming also can be used. One or more pages of data are typically stored in one row of memory cells. For example, one or more pages of data may be stored in memory cells connected to a common word line.

A page includes user data and overhead data (also called system data). Overhead data typically includes header information and Error Correction Codes (ECC) that have been calculated from the user data of the sector. The Control Circuit (or other component) calculates the ECC when data are being written into the array, and also checks the ECC when data are being read from the array. In one embodiment, a page includes data stored in all memory cells connected to a common word line.

In some examples, the system programs, erases, and reads at the same unit of operation. In other embodiments, the system programs, erases, and reads at different units of operation. In some examples, the system programs/writes and erases, while in other examples the system only needs to program/write, without the need to erase, because the system can program/write zeros and ones (or other data values) and can thus overwrite previously stored information.

As used herein, a memory storage unit is the set of memory cells representing the smallest storage unit of operation for the memory technology to store/write/program data in to the memory structure 104. For example, in one embodiment, the memory storage unit is a page sized to hold 4 KB of data. In certain embodiments, a complete memory storage unit is sized to match the number of physical memory cells across a row of the memory structure 104. In one embodiment, an incomplete memory storage unit has fewer physical memory cells than a complete memory storage unit.

FIG. 1C is a block diagram depicting one embodiment of the sense block SB1 of FIG. 1A. Sense block SB1 is partitioned into one or more core portions, referred to as sense modules (e.g., SM0) or sense amplifiers, and a common portion, referred to as a managing circuit (e.g., MC0). In one embodiment, there is a separate sense module for each bit line and one common managing circuit for a set of sense modules, such as SM0, SM1, SM2 and SM3. Each of the sense modules in a group communicates with the associated managing circuit via a data bus 130. Thus, there are one or more managing circuits which communicate with the sense modules of a set of memory cells.

Each sense module SM0, SM1, SM2 and SM3 includes sense circuitry SC0, SC1, SC2 and SC3, respectively, that performs sensing by determining whether a conduction current in a connected bit line BL0, BL1, BL2 and BL3, respectively, is above or below a predetermined threshold voltage (verify voltage). Each sense module SM0, SM1, SM2 and SM3 also includes a bit line latch BLL0, BLL1, BLL2 and BLL3, respectively, that is used to set a voltage condition on the connected bit line. For example, during a programming operation, a predetermined state latched in a bit line latch will result in the connected bit line being pulled to a lockout state (e.g., 1.5-3 V), a slow programming state (e.g., 0.5-1 V) or a normal programming state (e.g., 0 V).

Managing circuit MC0 includes a data latch processor 132, four example sets of data latches 134(0), 134(1), 134(2) and 134(3) and an I/O interface 136 coupled between the sets of data latches 134 and lines 122. In this example, each set of latches is associated with one of the bit lines. For example, data latches 134(0) are associated with bit line BL0, data latches 134(1) are associated with bit line BL1, data latches 134(2) are associated with bit line BL2, and data latches 134(3) are associated with bit line BL3.

Each set of data latches includes data latches identified by LDL 138, MDL 140, and UDL 142, in this embodiment. LDL 138 stores a bit for a lower page of write data, MDL 140 stores a bit for a middle page of write data, and UDL 142 stores a bit for an upper page of write data, in a memory which stores three bits of data in each memory cell. Note that there may be one set of such latches associated with each bit line. The latches 134 also may be used to store data read from the non-volatile memory cells.

Additional or fewer data latches per set also could be used. For example, in a two-bit per memory cell implementation, the MDL data latch for the middle page of data is not needed. A four-bit per memory cell implementation can use LDL, LMDL (lower-middle page), UMDL (upper-middle page), and UDL latches. The techniques described herein are meant to encompass such variations. In a further option, another latch is used to identify whether a memory cell is in a slow programming mode when its threshold voltage is within a specified margin of the verify voltage of its target data state.

Data latch processor 132 performs computations during reading and programming. For reading, data latch processor 132 determines the data state stored in the sensed memory cell and stores the data in the set of data latches. For full programming and refresh programming, data latch processor 132 reads the latches to determine the data state which is to be written to a memory cell.

During reading, the operation of the system is under the control of microcontroller 124 which controls the supply of control gate voltages to the addressed memory cell. As it steps through the various predefined control gate voltages corresponding to the various memory states supported by the memory, the sense module may trip at one of these voltages and a corresponding output will be provided from the sense module to data latch processor 132 via data bus 130. At that point, data latch processor 132 determines the memory state by considering the tripping event(s) of the sense module and the information about the applied control gate voltage from microcontroller 124 via input lines 144.

Data latch processor 132 then computes a binary encoding for the memory state and stores the resultant data bits into data latches 134. For example, the memory state for a memory cell associated with bit line BL0 may be stored in latches 134(0), etc. Herein, a "memory state" may also be referred to as a "data state." In another embodiment of the managing circuit MC0, the bit line latch serves both as a latch for latching the output of the sense module and also as a bit line latch as described above.

In an embodiment, MCU 124 executes instructions to control data latch processor 132 to test conditions of non-volatile memory cells in response to voltages applied to memory structure 104 (such as reference voltages applied to the non-volatile memory cells). The condition of a non-volatile memory cell can be any physical parameter of a non-volatile memory cell. Example conditions include, but are not limited to, a data state, a conduction current, a resistance, and a transistor threshold voltage.

In an embodiment, MCU 124 executes instructions to control data latch processor 132 to determine a data state of memory cells. The data state may be defined by a range of some physical parameter including, but not limited to, transistor threshold voltage, resistance, or current. Thus, to determine a data state means to determine what range of a certain physical parameter a memory cell is in.

In an embodiment, MCU 124 executes instructions to control data latch processor 132 to determine whether a memory cell conducts a current in response to voltages applied to the memory cell. In an embodiment, MCU 124 executes instructions to control data latch processor 132 to determine whether the threshold voltage of a memory cell is above or below a reference voltage applied to the memory cell.

During program or verify operations, the data to be programmed (write data) are stored in data latches 134 from lines 122, in the LDL, MDL, and UDL data latches. For example, data to be programmed in a selected memory cell associated with bit line BL0 may be stored in latches 134(0), data to be programmed in a selected memory cell associated with bit line BL1 may be stored in latches 134(1), etc. The programming operation, under the control of microcontroller 124, comprises a series of programming voltage pulses applied to the control gates of the addressed memory cells. Each programming voltage is followed by a read back (verify test) to determine if the memory cell has been programmed to the desired memory state.

In some cases, data latch processor 132 monitors the read back memory state relative to the desired memory state. When the two states agree, data latch processor 132 sets the bit line latch to cause the bit line to be pulled to a state designating program inhibit. This inhibits the memory cell coupled to the bit line from further programming even if programming voltages appear on its control gate. In other embodiments, data latch processor 132 initially loads the bit line latch, and the sense circuitry sets the bit line latch to an inhibit value during the verify process.

Figure 2:
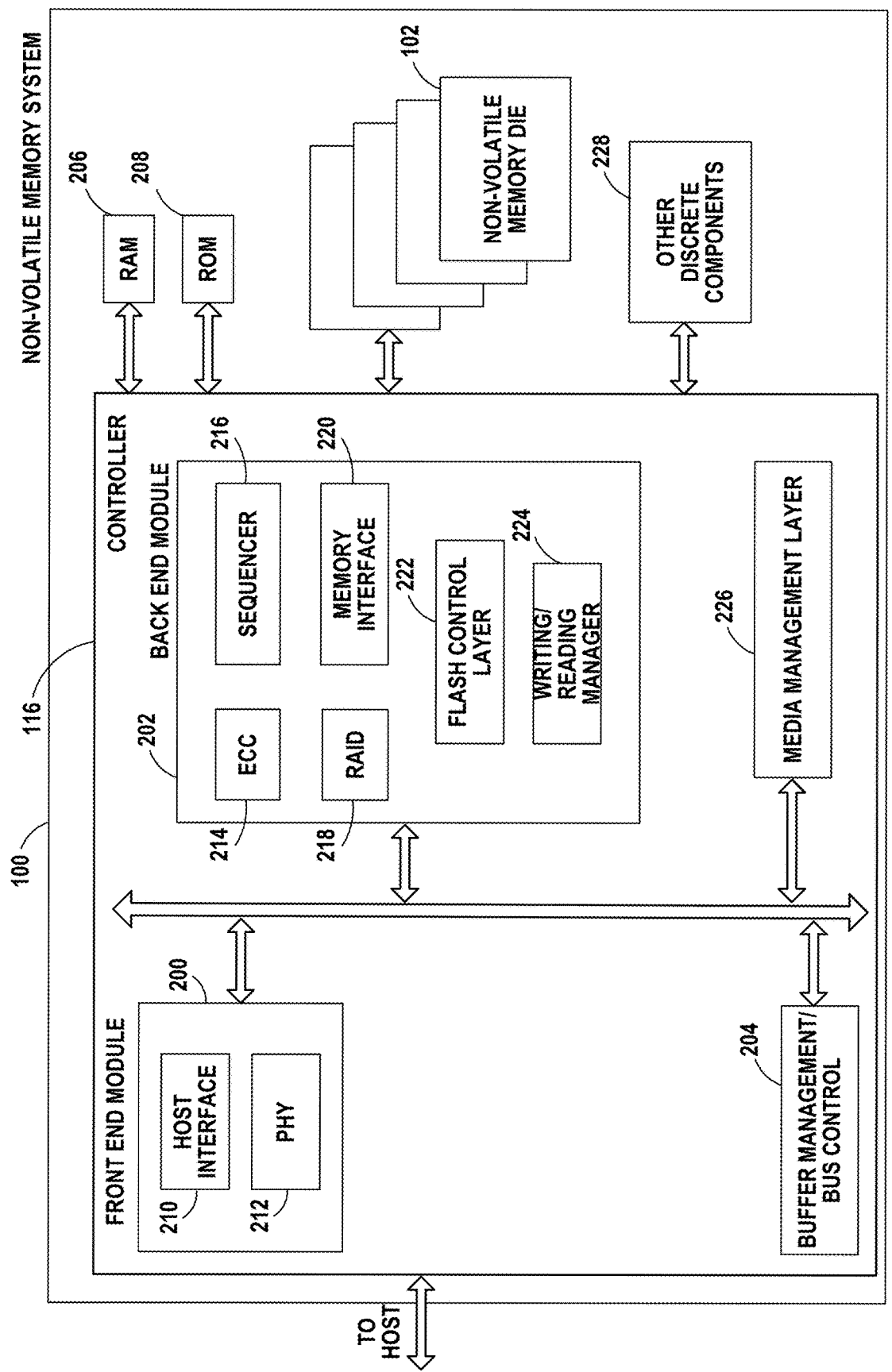
FIG. 2 is a block diagram depicting one embodiment of a memory system.

FIG. 2 is a block diagram of example memory system 100, depicting more details of one embodiment of controller 116. In an embodiment, controller 116 is a flash memory controller. Non-volatile memory 102 is not limited to flash memory technology. Thus, controller 116 is not limited to the example of a flash memory controller. As used herein, a flash memory controller is a device that manages data stored in flash memory and communicates with a host, such as a computer or electronic device.

In operation, when a host needs to read data from or write data to the flash memory, the host will communicate with the flash memory controller. If the host provides a logical address to which data are to be read/written, the flash memory controller can convert the logical address received from the host to a physical address in the flash memory. Alternatively, the host can provide the physical address.

The flash memory controller also can perform various memory management functions, such as wear leveling (distributing writes to avoid wearing out specific blocks of memory that would otherwise be repeatedly written to) and garbage collection (after a block is full, moving only the valid pages of data to a new block, so the full block can be erased and reused).

The interface between controller 116 and non-volatile memory die 102 may be any suitable flash interface. In one embodiment, memory system 100 may be a card based system, such as a secure digital (SD) or a micro secure digital (micro-SD) card. In an alternate embodiment, memory system 100 may be part of an embedded memory system. For example, the flash memory may be embedded within the host. In other example, memory system 100 can be in the form of a solid state drive (SSD).

In some embodiments, non-volatile memory system 100 includes a single channel between controller 116 and non-volatile memory die 102, the subject matter described herein is not limited to having a single memory channel. For example, in some memory system architectures, 2, 4, 8 or more channels may exist between the Control Circuit and the memory die, depending on Control Circuit capabilities. In any of the embodiments described herein, more than a single channel may exist between the Control Circuit and the memory die, even if a single channel is shown in the drawings.

As depicted in FIG. 2, controller 116 includes a front end module 200 that interfaces with a host, a back end module 202 that interfaces with the one or more non-volatile memory die 102, and various other modules that perform functions which will now be described in detail. The architecture depicted in FIG. 2 is one example implementation that may (or may not) use the components of controller 116 depicted in FIG. 1A (i.e., RAM, ROM, processor, interface).

Referring again to modules of controller 116, a buffer management/bus control 204 manages buffers in random access memory (RAM) 206 and controls the internal bus arbitration of controller 116. A read only memory (ROM) 208 stores system boot code. Although illustrated in FIG. 2 as located separately from controller 116, in other embodiments one or both of the RAM 206 and ROM 208 may be located within controller 116. In yet other embodiments, portions of RAM and ROM may be located both within controller 116 and outside controller 116. Further, in some implementations, controller 116, RAM 206, and ROM 208 may be located on separate semiconductor die.

Front end module 200 includes a host interface 210 and a physical layer interface (PHY) 212 that provide the electrical interface with the host or next level storage controller. The choice of the type of host interface 210 can depend on the type of memory being used. Examples of host interfaces 210 include, but are not limited to, SATA, SATA Express, SAS, Fibre Channel, USB, PCIe, and NVMe. Host interface 210 typically facilitates transfer for data, control signals, and timing signals.

Back end module 202 includes an ECC engine 214 that encodes the data bytes received from the host, and decodes and error corrects the data bytes read from the non-volatile memory. A command sequencer 216 generates command sequences, such as program and erase command sequences, to be transmitted to non-volatile memory die 102. A RAID module 218 manages generation of RAID parity and recovery of failed data.

The RAID parity may be used as an additional level of integrity protection for the data being written into the non-volatile memory system 100. In some cases, the RAID module 218 may be a part of the ECC engine 214. Note that the RAID parity may be added as one more extra die as implied by the common name, but RAID parity also may be added within the existing die, e.g., as an extra plane, or extra block, or extra WLs within a block.

A memory interface 220 provides the command sequences to non-volatile memory die 102 and receives status information from non-volatile memory die 102. In one embodiment, memory interface 220 may be a double data rate (DDR) interface. A flash control layer 222 controls the overall operation of back end module 202.

One embodiment includes a writing/reading manager 224, which can be used to manage (in conjunction with the circuits on the memory die) the writing and reading of memory cells. In some embodiments, writing/reading manager 224 performs the processes depicted in the flow charts described below.

Additional components of system 100 illustrated in FIG. 2 include media management layer 226, which performs wear leveling of memory cells of non-volatile memory die 102. System 100 also includes other discrete components 228, such as external electrical interfaces, external RAM, resistors, capacitors, or other components that may interface with controller 116. In alternative embodiments, one or more of physical layer interface 212, RAID module 218, media management layer 226 and buffer management/bus controller 204 are optional components that are not necessary in controller 116.

The Flash Translation Layer (FTL) or Media Management Layer (MML) 226 may be integrated as part of the flash management that may handle flash errors and interfacing with the host. In particular, MML may be a module in flash management and may be responsible for the internals of NAND management.

In particular, MML 226 may include an algorithm in the memory device firmware which translates writes from the host into writes to memory structure 104 of die 102. MML 226 may be needed because memory structure 104 may have limited endurance, may only be written in multiples of pages, and/or may not be written unless it is erased as a block.

Controller 116 may interface with one or more memory die 102. In one embodiment, controller 116 and multiple memory die (together comprising non-volatile storage system 100) implement an SSD, which can emulate, replace or be used instead of a hard disk drive inside a host, as a NAS device, in a laptop, in a tablet, in a server, etc. Additionally, the SSD need not be made to work as a hard drive.

Some embodiments of a non-volatile storage system will include one memory die 102 connected to one controller 116. However, other embodiments may include multiple memory die 102 in communication with one or more controllers 116. In one example, the multiple memory die can be grouped into a set of memory packages. Each memory package includes one or more memory die in communication with controller 116.

In one embodiment, a memory package includes a printed circuit board (or similar structure) with one or more memory die mounted thereon. In some embodiments, a memory package can include molding material to encase the memory dies of the memory package. In some embodiments, controller 116 is physically separate from any of the memory packages.

The memory systems discussed above can be erased, programmed/written and read. In an embodiment, at the end of a successful programming process (with verification), the threshold voltages of the memory cells should be within one or more distributions of threshold voltages for programmed memory cells or within a distribution of threshold voltages for erased memory cells, as appropriate.

Figure 3:
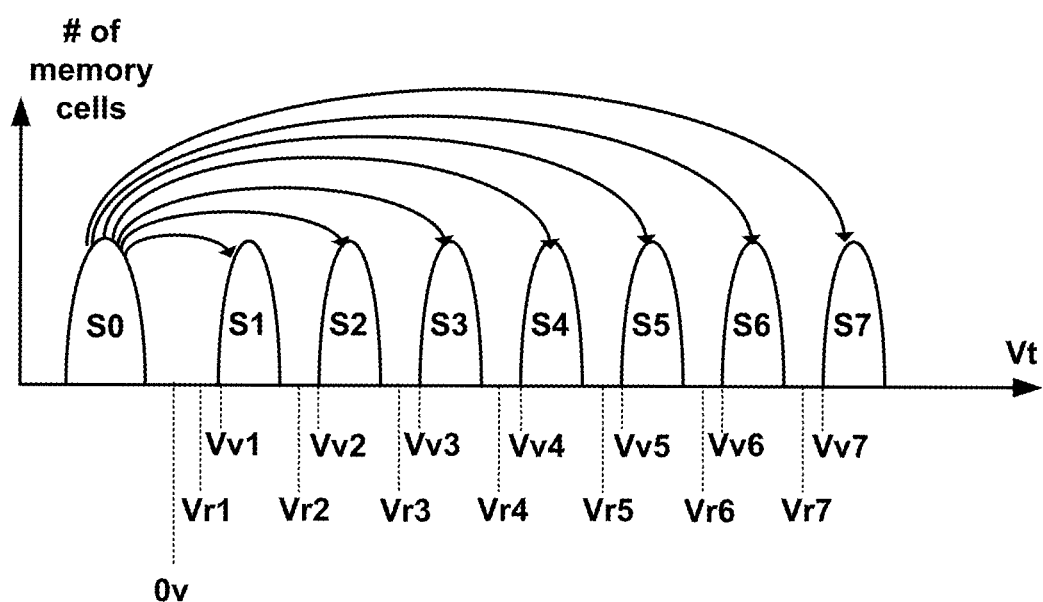
FIG. 3 depicts example threshold voltage distributions.

FIG. 3 illustrates example threshold voltage distributions for the memory cell array when each memory cell stores three bits of data. Other embodiments, however, may use other data capacities per memory cell (e.g., such as one, two, four, or five bits of data per memory cell).

FIG. 3 shows eight threshold voltage distributions, corresponding to eight data states. The first threshold voltage distribution (data state) S0 represents memory cells that are erased. The other seven threshold voltage distributions (data states) S1-S7 represent memory cells that are programmed and, therefore, also are called programmed states. Each threshold voltage distribution (data state) corresponds to predetermined values for the set of data bits.

The specific relationship between the data programmed into the memory cell and the threshold voltage levels of the cell depends upon the data encoding scheme adopted for the cells. In one embodiment, data values are assigned to the threshold voltage ranges using a Gray code assignment so that if the threshold voltage of a memory erroneously shifts to its neighboring data state, only one bit will be affected.

FIG. 3 also shows seven read reference voltages, Vr1, Vr2, Vr3, Vr4, Vr5, Vr6, and Vr7, for reading data from memory cells. By testing (e.g., performing sense operations) whether the threshold voltage of a given memory cell is above or below the seven read reference voltages, the system can determine the data state (e.g., S0, S1, S2, S3, . . . ) of each memory cell.

FIG. 3 also shows seven verify reference voltages, Vv1, Vv2, Vv3, Vv4, Vv5, Vv6, and Vv7. When programming memory cells to data states S1, S2, S3, S4, S5, S6 and S7 the system will test whether those memory cells have a threshold voltage greater than or equal to Vv1, Vv2, Vv3, Vv4, Vv5, Vv6 and Vv7, respectively.

In one embodiment, known as full sequence programming, memory cells can be programmed from the erased data state S0 directly to any of the programmed data states S1-S7. For example, a population of memory cells to be programmed may first be erased so that all memory cells in the population are in erased data state S0. Then, a programming process is used to program memory cells directly into data states S1, S2, S3, S4, S5, S6, and/or S7.

For example, while some memory cells are being programmed from data state S0 to data state S1, other memory cells are being programmed from data state S0 to data state S2 and/or from data state S0 to data state S3, and so on. The arrows of FIG. 3 represent the full sequence programming. The technology described herein can also be used with other types of programming in addition to full sequence programming, including, but not limited to, multiple stage/phase programming. In some embodiments, data states S1-S7 can overlap, with controller 116 relying on ECC to identify the correct data being stored.

In one embodiment, when a block is subjected to an erase operation, all memory cells are moved to data state S0, the erased state. The proposed technology described herein can be used for embodiments in which each memory cell stores one bit of data per memory cell (also referred to as SLC) and for embodiments in which each memory cell stores multiple bits of data per memory cell (FIG. 3). When memory cells store one bit of data per memory cell, there may be two data states. When memory cells store two bits of data per memory cell, there may be four data states.

Figure 4:
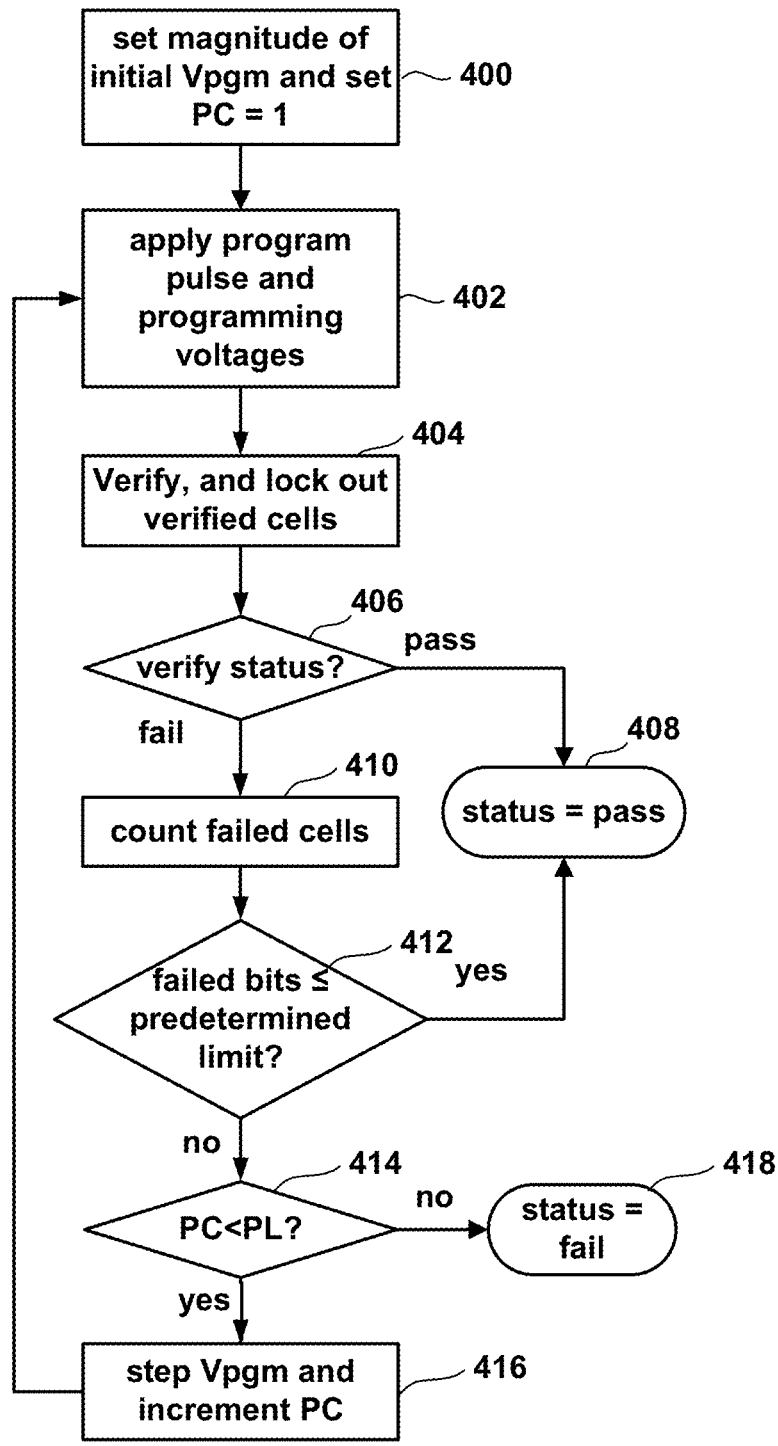
FIG. 4 is a flow chart describing one embodiment of a process for programming/writing data into memory cells connected to a common word line.

FIG. 4 is a flowchart describing one embodiment of a programming process. In one example embodiment, the process of FIG. 4 is performed on memory die 102 using the one or more control circuits discussed above (see FIG. 1) at the direction of microcontroller 124. The process of FIG. 4 also can be used to implement full sequence programming discussed above. The process of FIG. 4 also can be used to implement each phase of a multi-phase programming process. Additionally, the process of FIG. 4 can be used to program memory cells connected to the same word line with one bit of data per memory cell.

Typically, the program voltage applied to the control gates (via a selected word line) during a program operation is applied as a series of program pulses. Between programming pulses are a set of verify pulses to perform verification. In many implementations, the magnitude of the program pulses is increased with each successive pulse by a predetermined step size. In step 400, the programming voltage (Vpgm) is initialized to the starting magnitude (e.g., ~12-16V or another suitable level) and a program counter PC maintained by microcontroller 124 is initialized at 1.

In step 402, a program pulse of the program signal Vpgm is applied to the selected word line (the word line selected for programming). In one embodiment, the group of memory cells being programmed concurrently are all connected to the same word line (the selected word line). The unselected word lines receive one or more boosting voltages (e.g., ~7-11 volts) to perform boosting schemes known in the art. If a memory cell should be programmed, then the corresponding bit line is grounded. On the other hand, if the memory cell should remain at its current threshold voltage, then the corresponding bit line is connected to Vdd to inhibit programming.

In step 402, the program pulse is concurrently applied to all memory cells connected to the selected word line so that all of the memory cells connected to the selected word line are programmed concurrently. That is, they are programmed at the same time or during overlapping times (both of which are considered concurrent). In this manner all of the memory cells connected to the selected word line will concurrently have their threshold voltage change, unless they have been locked out from programming.

In step 404, the appropriate memory cells are verified using the appropriate set of verify reference voltages to perform one or more verify operations. In one embodiment, the verification process is performed by applying the testing whether the threshold voltages of the memory cells selected for programming have reached the appropriate verify reference voltage.

In step 406, it is determined whether all the memory cells have reached their target threshold voltages (pass). If so, the programming process is complete and successful because all selected memory cells were programmed and verified to their target data states. A status of "PASS" is reported in step 408. If, in 406, it is determined that not all of the memory cells have reached their target threshold voltages (fail), then the programming process continues to step 410.

In step 410, the system counts the number of memory cells that have not yet reached their respective target threshold voltage distribution. That is, the system counts the number of memory cells that have failed the verify process. This counting can be done by microcontroller 124, controller 116, or other logic. In one implementation, each of the sense blocks will store the status (pass/fail) of their respective cells. In one embodiment, there is one total count, which reflects the total number of memory cells currently being programmed that have failed the last verify step. In another embodiment, separate counts are kept for each data state.

In step 412, it is determined whether the count from step 410 is less than or equal to a predetermined limit. In one embodiment, the predetermined limit is the number of bits that can be corrected by ECC during a read process for the page of memory cells. If the number of failed memory cells is less than or equal to the predetermined limit, than the programming process can stop and a status of "PASS" is reported in step 408.

In this situation, enough memory cells programmed correctly such that the few remaining memory cells that have not been completely programmed can be corrected using ECC during the read process. In some embodiments, step 410 will count the number of failed cells for each sector, each target data state or other unit, and those counts will individually or collectively be compared to a threshold in step 412.

In another embodiment, the predetermined limit can be less than the number of bits that can be corrected by ECC during a read process to allow for future errors. When programming less than all of the memory cells for a page, or comparing a count for only one data state (or less than all states), than the predetermined limit can be a portion (pro-rata or not pro-rata) of the number of bits that can be corrected by ECC during a read process for the page of memory cells. In some embodiments, the limit is not predetermined. Instead, it changes based on the number of errors already counted for the page, the number of program-erase cycles performed or other criteria.

If number of failed memory cells is not less than the predetermined limit, than the programming process continues at step 414 and program counter PC is checked against the program limit value (PL). Examples of program limit values include 12, 20 and 30, although other values can be used. If the program counter PC is not less than the program limit value PL, then the program process is considered to have failed and a status of FAIL is reported in step 418. This is one example of a program fault.

If the program counter PC is less than the program limit value PL, then the process continues at step 416 during which time program counter PC is incremented by 1 and the program voltage Vpgm is stepped up to the next magnitude. For example, the next pulse will have a magnitude greater than the previous pulse by a step size (e.g., a step size of 0.1-0.5 volts). After step 416, the process loops back to step 402 and another program pulse is applied to the selected word line so that another iteration (steps 402-416) of the programming process of FIG. 4 is performed.

In general, during verify operations and read operations, the selected word line is connected to a voltage (one example of a reference signal), a level of which is specified for each read operation (e.g., read reference voltages Vr1, Vr2, Vr3, Vr4, Vr5, Vr6, and Vr7, of FIG. 3) or verify operation (e.g., verify reference voltages Vv1, Vv2, Vv3, Vv4, Vv5, Vv6, and Vv7 of FIG. 3) to determine whether a threshold voltage of the concerned memory cell has reached such level. After applying the word line voltage, the conduction current of the memory cell is measured to determine whether the memory cell turned on (conducted current) in response to the voltage applied to the word line.

If the conduction current is measured to be greater than a certain value, then it is assumed that the memory cell turned ON and the voltage applied to the word line is greater than the threshold voltage of the memory cell. If the conduction current is not measured to be greater than the certain value, then it is assumed that the memory cell did not turn ON and the voltage applied to the word line is not greater than the threshold voltage of the memory cell. During a read or verify process, the unselected memory cells are provided with one or more read pass voltages at their control gates so that these memory cells will operate as pass gates (e.g., conducting current regardless of whether they are programmed or erased).

There are many ways to measure the conduction current of a memory cell during a read or verify operation. In one example, the conduction current of a memory cell is measured by the rate it discharges or charges a dedicated capacitor in a sense amplifier. In another example, the conduction current of the selected memory cell allows (or fails to allow) the NAND string that includes the memory cell to discharge a corresponding bit line.

The voltage on the bit line is measured after a period of time to see whether it has been discharged. Note that the technology described herein can be used with different methods known in the art for verifying/reading. Other read and verify techniques known in the art can also be used.

In some embodiments, controller 116 receives a request from the host to program host data into the memory system. In some embodiments, controller 116 arranges the host data to be programmed into units of data. For example, controller 116 can arrange the host data into pages, partial pages (a subset of a page), word line units, blocks, jumbo blocks, or other units.

Step 402 includes applying a program voltage pulse on the selected word line. Step 404 includes verification, which in some embodiments includes applying the verify reference voltages on the selected word line. As steps 402 and 404 are part of an iterative loop, the program voltage is applied as a series of voltage pulses that increase in magnitude. Between voltage pulses, verify reference voltages may be applied.

Figure 5:
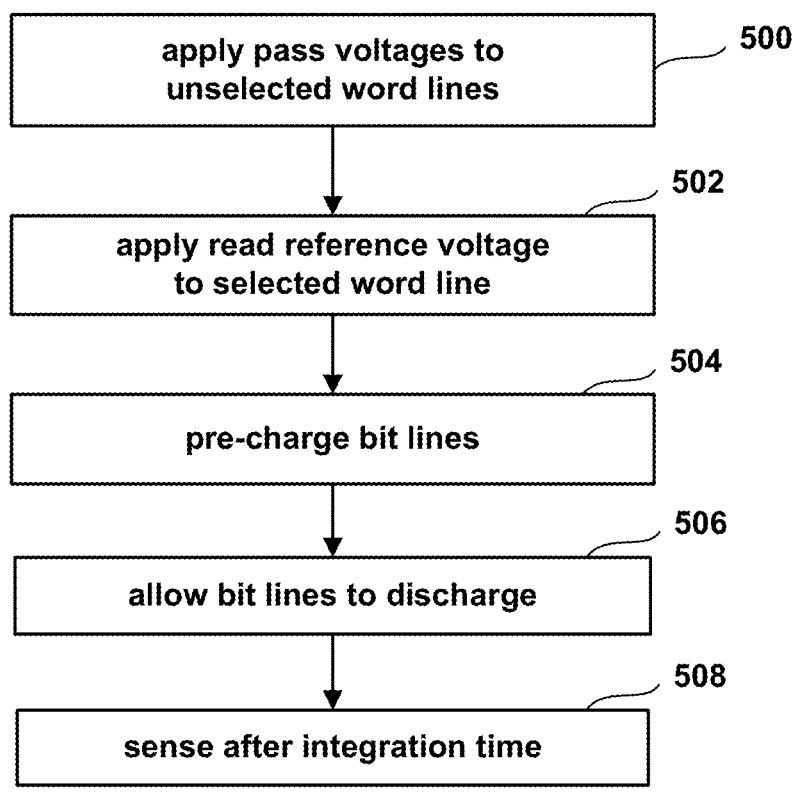
FIG. 5 is a flow chart describing one embodiment of a process for reading data from non-volatile memory cells.

FIG. 5 is a flow chart describing a sensing operation performed to read data from the memory cells. In step 500, a pass voltage is applied to unselected word lines so that unselected memory cells on a NAND string are conducting, which enables the system to test whether a selected memory cell conducts in response to the read reference voltage. This pass voltage is often referred to as Vread.

In step 502, the appropriate read reference voltage, also referred to as Vcgr, is applied to the selected word line. In one example of a system that stores one bit per memory cell, Vcgr=0V, or a small voltage near 0V.

In step 504, all of the bit lines are pre-charged. In one example embodiment, the bit lines are pre-charged by charging a capacitor in the sense amplifier and then putting the bit line in communication with the charged capacitor so that the bit line charges up.

In step 506, the bit line is allowed to discharge, for example, by discharging the capacitor.

In step 508, after a predetermined time period referred to as the "integration time" or "strobe time" the voltage of the capacitor is sampled to see whether the respective memory cell(s) conducted.

If the memory cell conducts in response to Vcgr, then the threshold voltage of the memory cell is less than Vcgr. If Vcgr=0V and the memory cell turns ON, then the memory cell is in the erased state and the data stored is 1. If Vcgr=0V and the memory cell does not turn ON, then the memory cell is in the programmed state and the data stored is 0.

Figure 6:
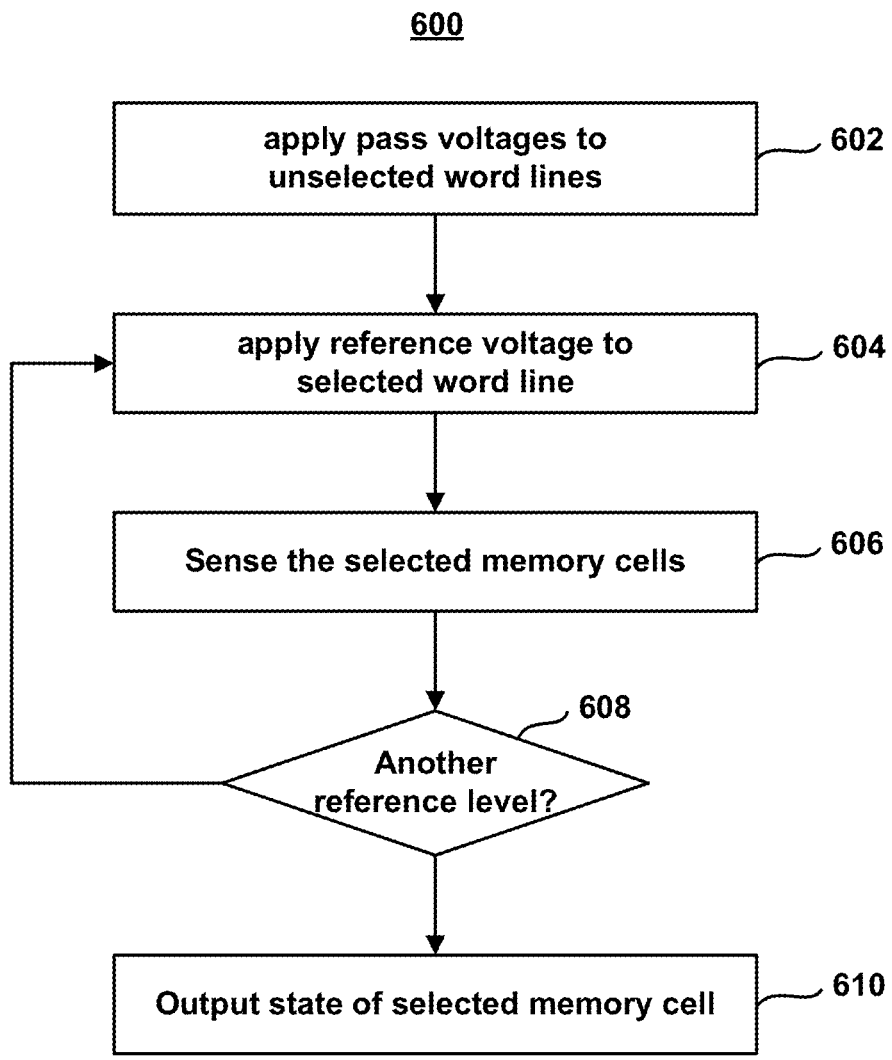
FIG. 6 is a flowchart of an embodiment of process for sensing memory cells.

FIG. 6 is a flowchart of an embodiment of process 600 for sensing memory cells. Process 600 may be used for reading or program verify. Process 600 senses at multiple reference levels. For a read operation, the process progressively steps through levels Vr1-Vr7 (FIG. 3), in one embodiment. For a program verify operation, the process progressively steps through levels Vv1-Vv7 (FIG. 3), in one embodiment.

Step 602 includes applying pass voltages to unselected word lines. Step 604 includes applying a reference voltage to the selected word line. This might be Vr1 or Vv1, for example.

Step 606 includes sensing the selected memory cells. In one embodiment, the sense module (e.g., SM0, SM1, . . . ) connected to the bit line for one of the selected memory cells may trip in response to the reference voltage applied to the selected word line. A corresponding output will be provided from the sense module to data latch processor 132 via data bus 130. Based on the reference level when the sense module trips, data latch processor 132 may determine the data state (e.g., S0-S7) of the selected memory cell. Note that steps 604-606 may be referred to herein as a "sensing phase."

Step 608 is a determination of whether there is another reference level to apply to the selected word line. If so, process 600 returns to step 604 to apply the next reference level. Step 606 is then performed again to test the selected memory cells.

After all reference levels have been applied to the selected word line, step 610 is performed. In step 610, data latch processor 132 outputs the data state (e.g., S0-S9) of each of the selected memory cells.

As described above, a NAND memory cell with a particular memory state is considered to have completed programming when a sensing operation determines the threshold voltage Vth of the memory cell is above the associated verify voltage. Flash memory technology has finite data retention characteristics as the stored charge on the floating gate (and trapped electrons in the oxides) continuously leaks through surrounding oxides. Because of data retention, when data are stored and kept for some time the programmed state cell tends to lose its charge and its threshold becomes lower. For nonvolatile memory, the higher the state the worse the data retention.

Figure 7:
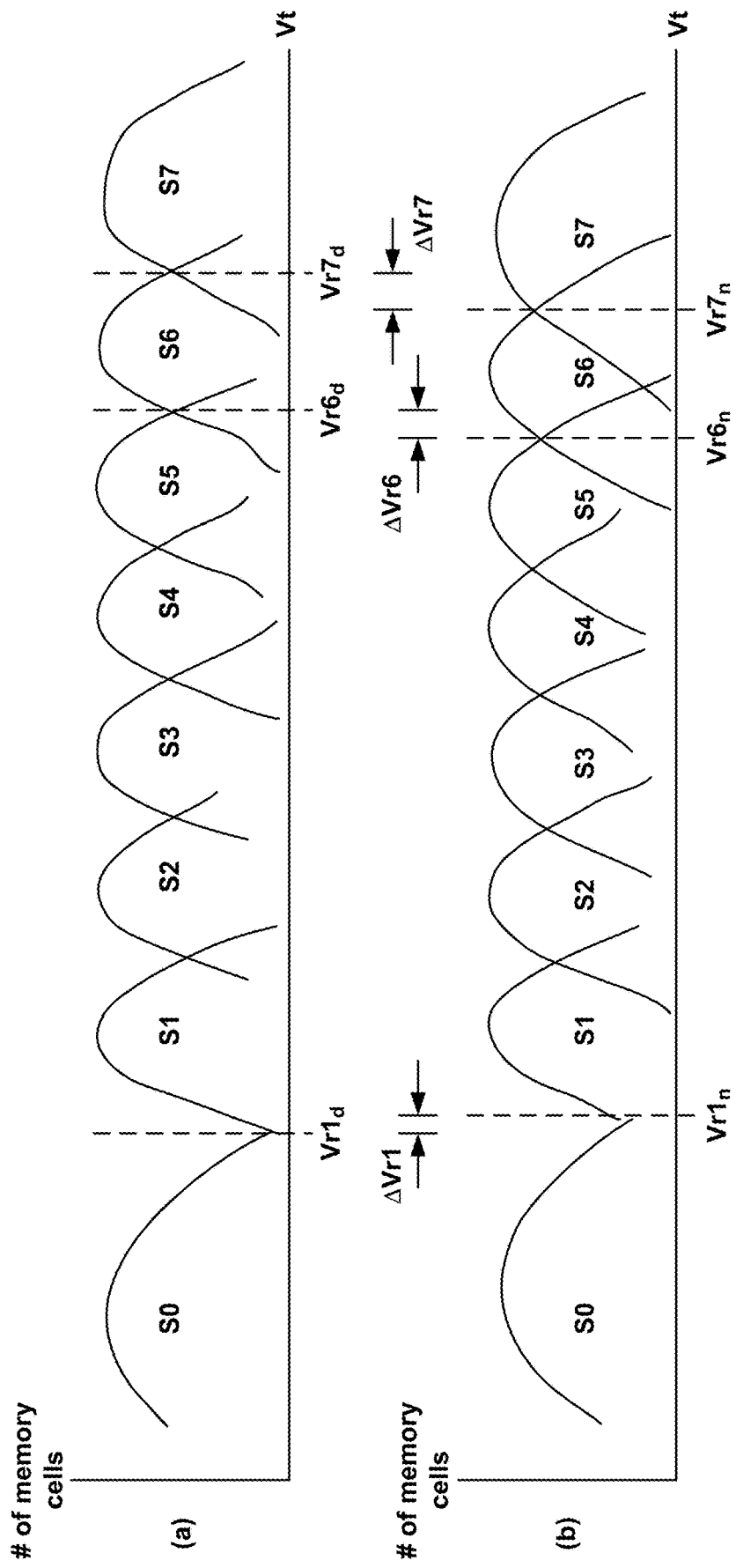
FIG. 7 depicts example threshold voltage distributions.

For example, FIG. 7 depicts example threshold voltage distributions for a memory cell array in which each memory cell stores three bits of data. The top diagram (a) depicts example threshold voltage distributions immediately after programming has completed. The lower diagram (b) depicts the threshold voltage distributions for the same memory cells after a high temperature bake, which accelerates the effect of data retention.

As can be seen by comparing the two diagrams, the threshold voltage distributions of erased state S0 and programmed state S1 have shift higher, and the threshold voltage distributions of programmed states S2-S7 have shifted lower. Data retention impacts the reliability of memory such as NAND memory.

Another issue impacting the reliability of memory such as NAND memory is a phenomenon commonly called read disturb, in which a read to one row of memory cells impacts the threshold voltages of unread memory cells in different rows of the same block. The effects of read disturb are cumulative. That is, the more times memory cells are read the greater the threshold voltage shift.

Figure 8:
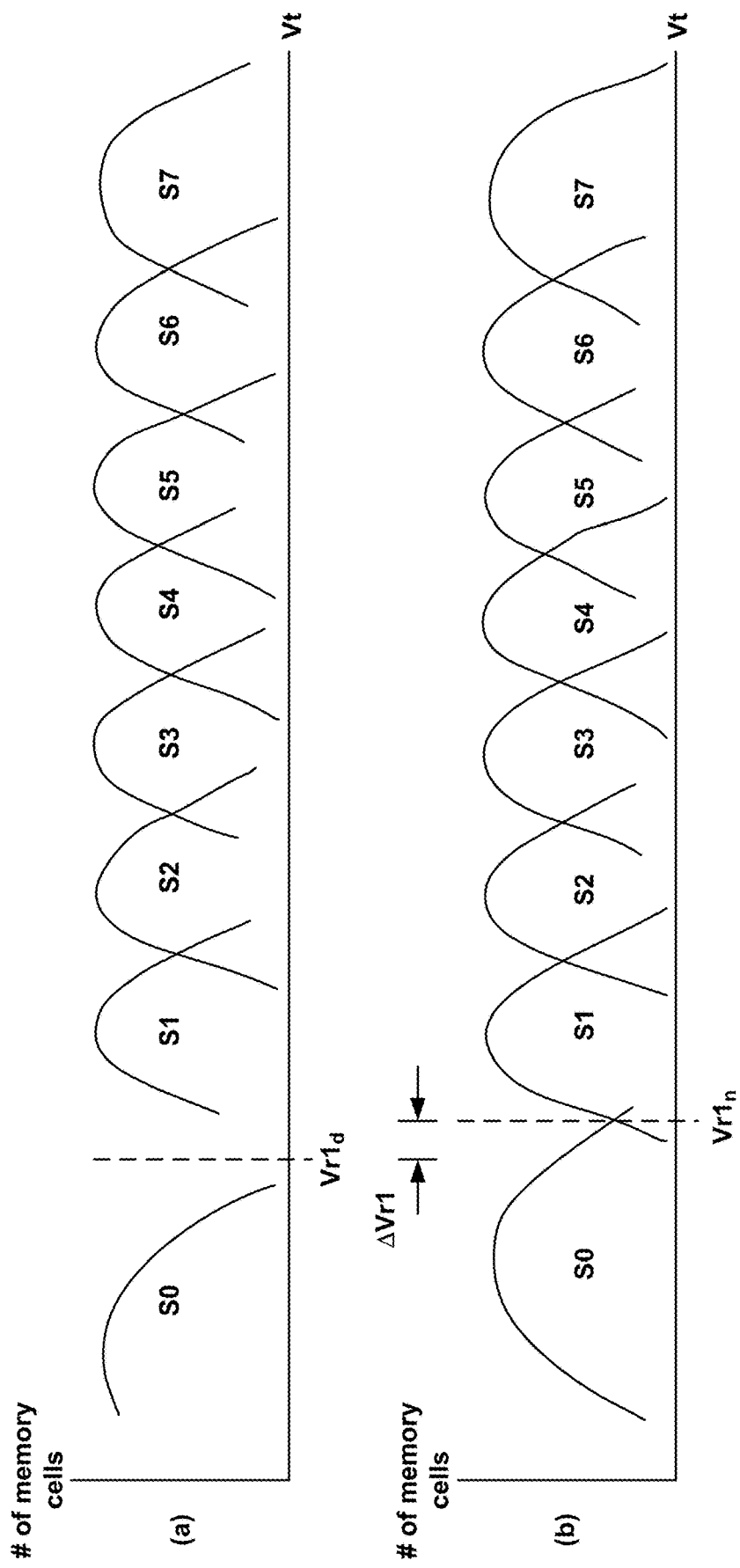
FIG. 8 depicts example threshold voltage distributions.

For example, FIG. 8 depicts example threshold voltage distributions for a memory cell array in which each memory cell stores three bits of data. The top diagram (a) depicts example threshold voltage distributions immediately after programming has completed. The lower diagram (b) depicts the threshold voltage distributions for the same memory cells after about ten thousand read cycles.

As can be seen by comparing the two diagrams, the threshold voltage distributions of erased state S0 has shifted higher, and the threshold voltage distributions of programmed states S1-S7 have shifted lower.

As described above, during read operations the system can determine the data state (e.g., S0, S1, S2, S3, . . . ) of each memory cell by testing (e.g., performing sense operations) whether the threshold voltage of a given memory cell is above or below various read reference voltages. In the example of FIG. 3, seven read reference voltages Vr1, Vr2, Vr3, Vr4, Vr5, Vr6, and Vr7 are used. As a consequence of data retention and read disturb, using fixed values for read reference voltages Vr1, Vr2, Vr3, Vr4, Vr5, Vr6, and Vr7 may result in read errors. As a result, read reference voltages may be modified in response to read errors.

Figure 9:
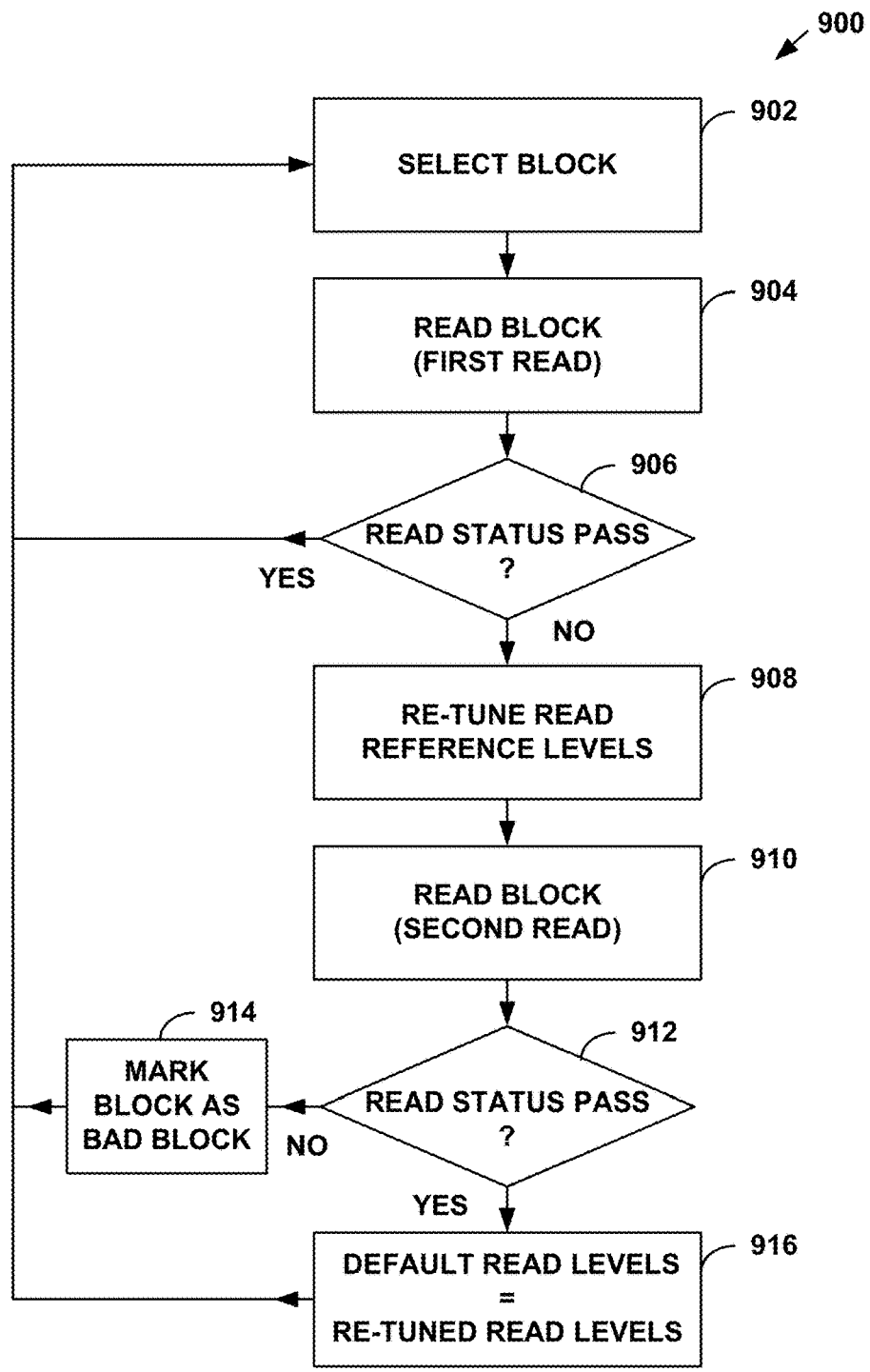
FIG. 9 is a flowchart of an example read process.

For example, FIG. 9 is a flowchart of an example read process 900 for use with memory cells, such as memory cells of memory structure 104 of FIG. 1A. In embodiments, example read process 900 may be implemented by a Control Circuit.

At step 902, a block is selected to be read.

At step 904, a first read operation is performed on the block of memory cells. In an embodiment, the block of memory cells are read using default read reference values (also referred to herein as "Read Levels"). For example, if the memory cells each store three bits of data, the first read operation uses default Read Levels $Vr1_d$, $Vr2_d$, $Vr3_d$, $Vr4_d$, $Vr5_d$, $Vr6_d$, and $Vr7_d$. Default Read Levels $Vr1_d$, $Vr2_d$, $Vr3_d$, $Vr4_d$, $Vr5_d$, $Vr6_d$, and $Vr7_d$ may be determined from empirical measurements and/or simulations, or other technique. To avoid overcrowding the drawings, FIGS. 7 and 8 depict a few default read reference voltages.

Referring again to FIG. 9, at step 906 a determination is made whether the read was successful. In an embodiment, a read status is successful (e.g., read status=PASS) if a number of read bit errors is less than or equal to the number of read bit errors that can be corrected by ECC (e.g., by ECC engine 214 of FIG. 2). Otherwise, the read status is unsuccessful (e.g., read status=FAIL).

If at step 906 a determination is made that the first read was successful, process 900 returns to step 902 to select a next block for reading.

If, however, at step 906 a determination is made that the first read was not successful, at step 908 Read Levels $Vr1_d$, $Vr2_d$, $Vr3_d$, $Vr4_d$, $Vr5_d$, $Vr6_d$, and $Vr7_d$ are re-tuned. In an embodiment, the Control Circuit modifies Read Levels $Vr1_d$, $Vr2_d$, $Vr3_d$, $Vr4_d$, $Vr5_d$, $Vr6_d$, and $Vr7_d$ to find new Read Levels $Vr1_n$, $Vr2_n$, $Vr3_n$, $Vr4_n$, $Vr5_n$, $Vr6_n$, and $Vr7_n$.

In embodiments, new Read Levels $Vr1_n$, $Vr2_n$, $Vr3_n$, $Vr4_n$, $Vr5_n$, $Vr6_n$, and $Vr7_n$ may be determined from empirical measurements and/or simulations, or other technique. In embodiments, the Control Circuit attempts to find new Read Levels $Vr1_n$, $Vr2_n$, $Vr3_n$, $Vr4_n$, $Vr5_n$, $Vr6_n$, and $Vr7_n$ that may successfully read the block of memory cells. To avoid overcrowding the drawings, FIGS. 7 and 8 depict a few new read reference voltages.

At step 910, a second read operation is performed on the block of memory cells using new Read Levels $Vr1_n$, $Vr2_n$, $Vr3_n$, $Vr4_n$, $Vr5_n$, $Vr6_n$, and $Vr7_n$.

At step 912 a determination is made whether the second read was successful. If at step 912 a determination is made that the read was not successful, at step 914 the block is marked as a bad block, and process 900 returns to step 902 to select a next block for reading.

If at step 912 a determination is made that the second read was successful, at step 916 default Read Levels $Vr1_d$, $Vr2_d$, $Vr3_d$, $Vr4_d$, $Vr5_d$, $Vr6_d$, and $Vr7_d$ are set to the new Read Levels $Vr1_n$, $Vr2_n$, $Vr3_n$, $Vr4_n$, $Vr5_n$, $Vr6_n$, and $Vr7_n$ determined at step 908. Process 900 then proceeds to step 902 to select a next block for reading.

Steps 908-916 are sometimes referred to as a "read retry" process because after a first read failure a second read attempt is performed using re-tuned Read Levels. Although process 900 may be used to successfully read blocks after an initial read failure, the process does nothing to address the underlying problems that may be causing the first read failures. For example, the read failures may be caused by threshold voltage shifts from data retention and/or read disturb described above. Thus, even after re-tuning Read Levels multiple times the read retry process may no longer be able successfully read blocks of memory cells.

Technology is described for a read retry process that attempts to address the underlying problems that may be causing the first read failures. In an embodiment, a block of memory cells is read a first time using a first set of read parameters. In an embodiment, the non-volatile memory cells are multi-level memory cells, and the first set of read parameters include Read Levels.

In an embodiment, after the initial read failure the first set of read parameters are modified to create a second set of read parameters to attempt to successfully read the block of non-volatile memory cells. The second set of read parameters is different than the first set of read parameters. In an embodiment, the first set of read parameters include Read Levels and the second set of read parameters include re-tuned Read Levels. In an embodiment, the block of memory cells is read a second time using the second set of read parameters, and the second read successfully reads the block of non-volatile memory cells.

In an embodiment, a determination/estimation/prediction is made that the first read failure was likely caused by data retention or read disturb. In embodiments, the determination/estimation/prediction is based on differences between the first set of read parameters and the second set or read parameters.

In an embodiment, the determination/estimation/prediction is based on differences between a first set of Read Levels and a second set of Read Levels. In an embodiment, the determination/estimation/prediction is based on a first difference between a first Read Level and a second Read Level exceeding a first threshold, or a second difference between a third Read Level and a fourth Read Level exceeding a second threshold.

In an embodiment, following the determination/estimation/prediction that the first read failure was likely caused by data retention or read disturb the block of memory cells is re-written. In an embodiment, following the determination/estimation/prediction that the first read failure was likely caused by data retention or read disturb the block of memory cells is erased and re-written. In an embodiment, following the determination/estimation/prediction that the first read failure was likely caused by data retention or read disturb the block of memory cells is flagged and subsequently re-written as a background operation.

Figure 10A:
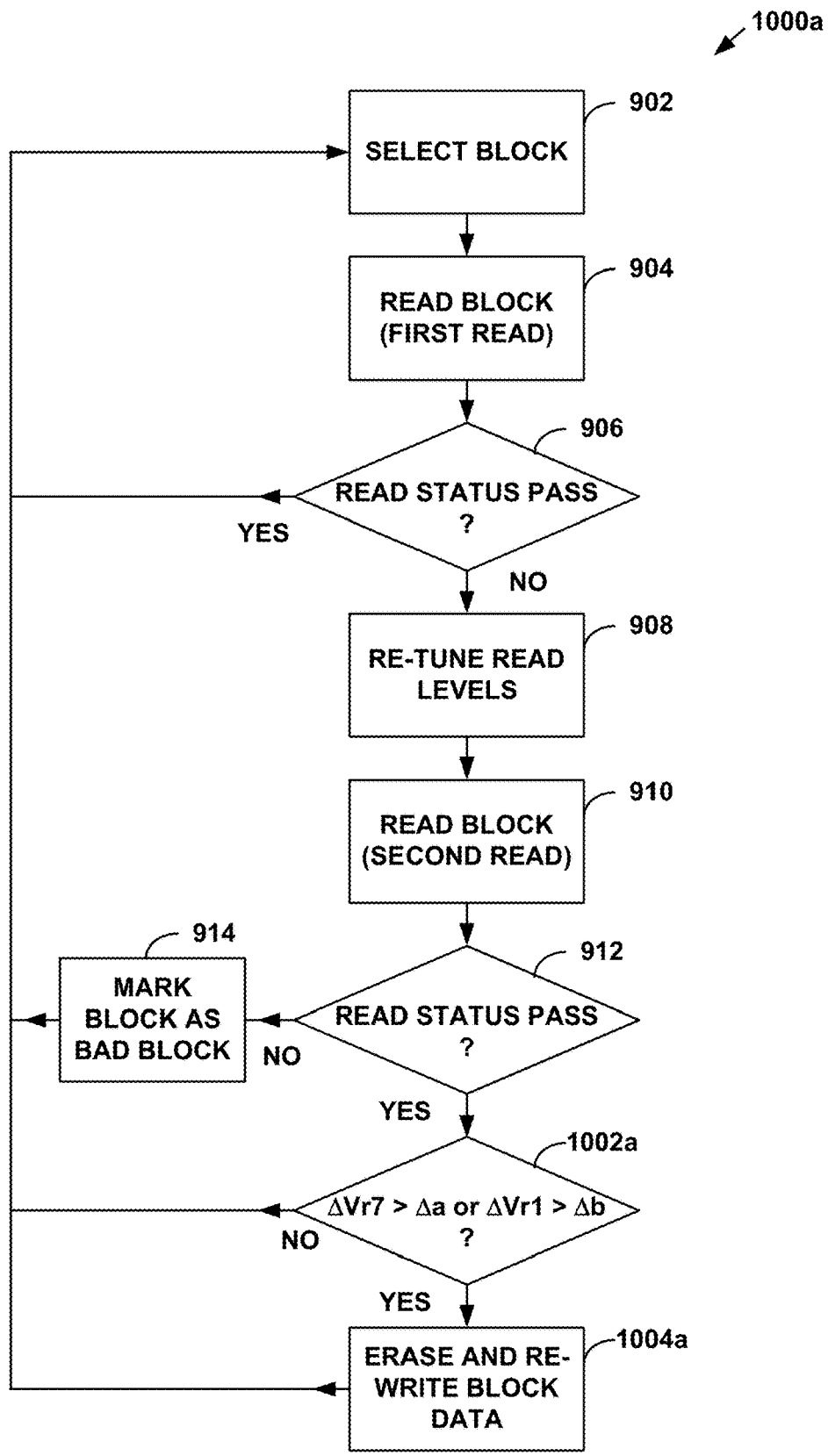
FIG. 10A is a flowchart of another example read process.

FIG. 10A is a flowchart of an example read process 1000a for use with memory cells, such as memory cells of memory structure 104 of FIG. 1A. In embodiments, example read process 1000a may be implemented by a Control Circuit.

Steps 902-914 are the same as those described above regarding FIG. 9. That is, after an initial read status failure at step 906, re-tuned Read Levels are determined at step 908, the block is read a second time at step 910 using the re-tuned Read Levels, and a determination is made at step 912 whether the second read was successful.

As described above, one characteristic of data retention and read disturb is that both conditions result in the threshold voltage distribution of erased state (e.g., state S0) shifting higher, and the threshold voltage distributions of a highest programmed state (e.g., programmed state S7) shifting lower. Technology is described that uses this characteristic as a proxy for identifying blocks that may have experienced data retention and/or read disturb. In embodiments, technology is described that uses this characteristic to determine/estimate/predict that the first read failure was likely caused by data retention or read disturb.

Thus, if at step 912 a determination is made that the second read was successful, at step 1002a a determination is made whether a first difference between default and new Read Levels for a highest programmed state is greater than a first threshold $\Delta a$ or a magnitude of a second difference between new and default Read Levels for a lowest programmed state is greater than a second threshold $\Delta b$.

For example, at step 1002a a determination is made whether a first difference between a first Read Level (default Read Level $Vr7_d$) and a second Read Level (new Read Level $Vr7_n$) is greater than first threshold $\Delta a$ (e.g., $\Delta Vr7=(Vr7_d-Vr7_n)>\Delta a$) or whether a second difference between a third Read Level (default new Read Level $Vr1_n$) and a fourth Read Level (default Read Level $Vr1_d$) is greater than second threshold $\Delta b$ (e.g., $\Delta Vr1l=(Vr1_n-Vr1_d)>\Delta b$).

If at step 1002a, a determination is made that the first difference between default Read Level $Vr7_d$ and new Read Level $Vr7_n$ is greater than first threshold $\Delta a$ or the second difference between default new Read Level $Vr1_n$ and default Read Level $Vr1_d$ is greater than second threshold $\Delta b$, then at step 1004a the block is erased and re-programmed.

In an embodiment, the block is immediately erased and re-programmed. In an alternative embodiment, the block may be flagged and the erase and re-write operation may be subsequently performed in the background.

Without wanting to be bound by any particular theory, it is believed that re-programming the memory cells of the block may refresh the memory cells to reset the cumulative data retention and read disturb to zero. In this regard, without wanting to be bound by any particular theory, it is believed that re-programming the memory cells of the block may address the underlying reliability issues of data retention and read disturb that may be causing the first read failure.

After step 1004a, process 1000a returns to step 902 to select a next block for reading.

If at step 1002a, a determination is made that the first difference between default Read Level $Vr7_d$ and new Read Level $Vr7_n$ is not greater than first threshold $\Delta a$ and the second difference between default new Read Level $Vr1_n$ and default Read Level $Vr1_d$ is not greater than second threshold $\Delta b$, then process 1000a returns to step 902 to select a next block for reading.

In example process 1000a, blocks that are successful second read after a read retry using reset read levels and that may have experienced data retention or read disturb are erased and re-programmed. In an alternative embodiment, blocks that are successful second read after a read retry using reset read levels and that may have experienced read disturb are re-programmed without first erasing the block.

Figure 10B:
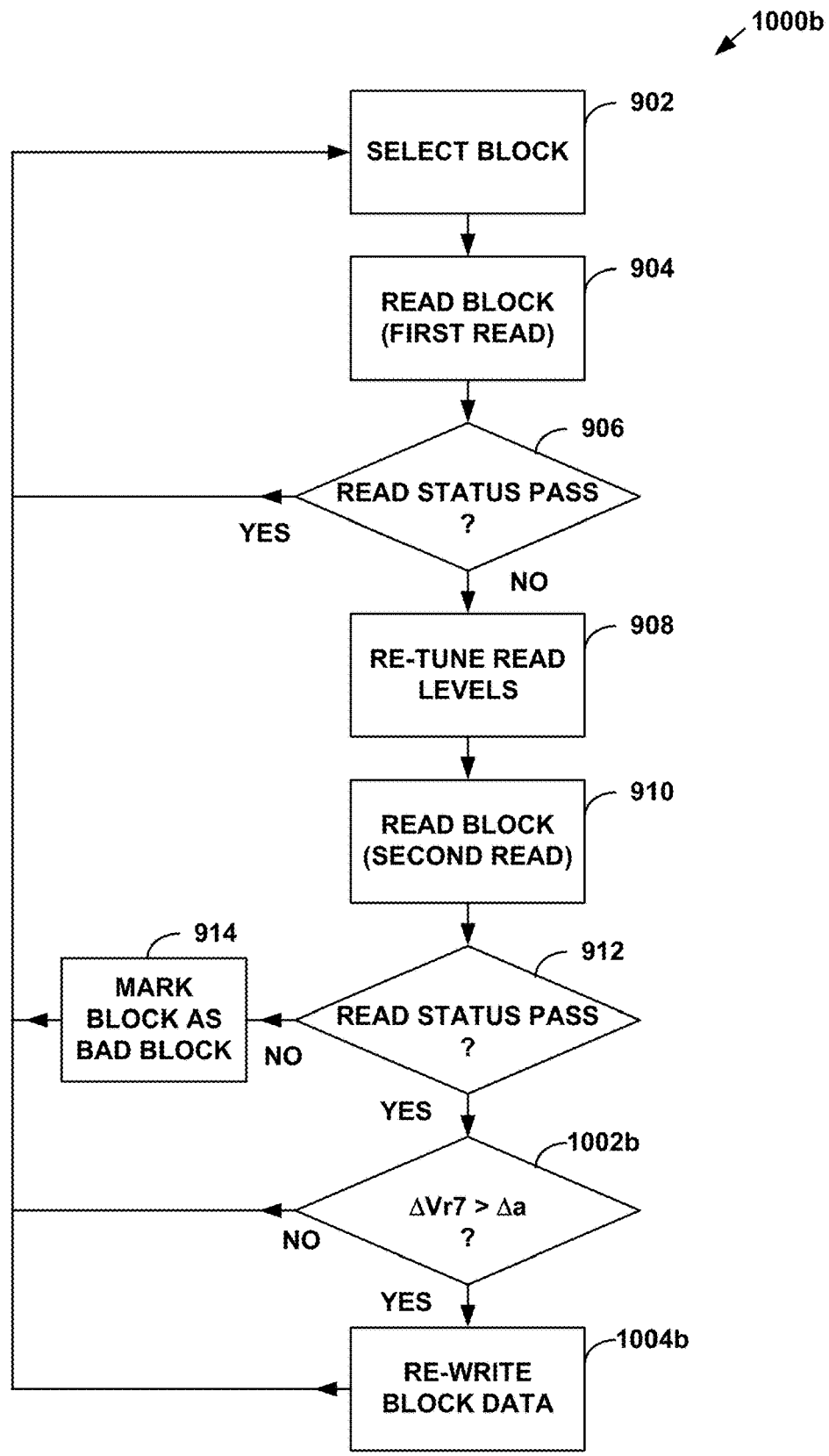
FIG. 10B is a flowchart of still another example read process.

In particular, FIG. 10B is a flowchart of another example read process 1000b for use with memory cells, such as memory cells of memory structure 104 of FIG. 1A. In embodiments, example read process 1000b may be implemented by a Control Circuit.

Steps 902-914 are the same as those described above regarding FIG. 9. That is, after an initial read status failure at step 906, re-tuned Read Levels are determined at step 908, the block is read a second time at step 910 using the re-tuned Read Levels, and a determination is made at step 912 whether the second read was successful.

As described above, one characteristic of read disturb is that the threshold voltage distributions of programmed states S1-S7 all shift lower. Technology is described that uses this characteristic as a proxy for identifying blocks that have experienced read disturb.

Thus, if at step 912 a determination is made that the second read was successful, at step 1002b a determination is made whether a first difference between default and new Read Levels for a highest programmed state is greater than a first threshold $\Delta a$.

For example, at step 1002b a determination is made whether a first difference between default a first Read Level (Read Level $Vr7_d$) and a second Read Level (new Read Level $Vr7_n$) is greater than first threshold $\Delta a$ (e.g., $\Delta Vr7=(Vr7_d-Vr7_n)>\Delta a$).

If at step 1002b, a determination is made that the first difference between default Read Level $Vr7_d$ and new Read Level $Vr7_n$ is greater than first threshold $\Delta a$, then at step 1004b the block is re-programmed without first erasing the block. In an embodiment, the block is immediately re-programmed. In an alternative embodiment, the block may be flagged and the re-write operation may be subsequently performed in the background.

Without wanting to be bound by any particular theory, it is believed that re-programming the memory cells of the block may refresh the memory cells to reset the cumulative data retention and read disturb to zero. In this regard, without wanting to be bound by any particular theory, it is believed that re-programming the memory cells of the block may address the underlying reliability issues of read disturb that may be causing the first read failure.

After step 1004b, process 1000a returns to step 902 to select a next block for reading.

If at step 1002b, a determination is made that the first difference between default Read Level $Vr7_d$ and new Read Level $Vr7_n$ is not greater than first threshold $\Delta a$, then process 1000b returns to step 902 to select a next block for reading.

Without wanting to be bound by any particular theory, it is believed that re-programming the memory cells of the block may refresh the memory cells to reset the cumulative read disturb to zero. In this regard, without wanting to be bound by any particular theory, it is believed that re-programming the memory cells of the block may address the underlying reliability issues of read disturb that may be causing the first read failure.

In the examples described above and depicted in FIGS. 10A and 10B, the first difference was determined using the highest Read Levels (e.g., $Vr7_n$ and $Vr7_d$) and the second difference was determine using the lowest Read Levels (e.g., $Vr1_d$ and $Vr1_n$). Persons of ordinary skill in the art will understand that additional and or different Read Levels may be used to determine/estimate/predict that the first read failure was likely caused by data retention or read disturb.

In an embodiment, an apparatus is provided that includes a memory structure including non-volatile memory cells, and a control circuit coupled to the memory cell. The control circuit configured to first read a block of non-volatile memory cells using a first plurality of read levels, determine that the first read fails to successfully read the block of non-volatile memory cells, second read the block of memory cells using a second plurality of read levels different from the first plurality of read levels, determine that the second read successfully reads the block of non-volatile memory cells, estimate that the first read failed because of data retention or read disturb, and erase and re-write data to the block of non-volatile memory cells.

In another embodiment, a method is provided that includes first reading a block of non-volatile memory cells using default read levels, determining that the first read failed to successfully read the block of non-volatile memory cells, re-tuning the first read levels to determine re-tuned read levels each associated with a corresponding default read level, second reading the block of non-volatile memory cells using the re-tuned read levels, determining a first difference between a first default read level and a corresponding first re-tuned read level, predicting based on the first difference that the first read failed because of data retention or read disturb, and re-writing data to the block of non-volatile memory cells.

In another embodiment, an apparatus is provided that includes a plurality of non-volatile memory cells and a control circuit coupled to the non-volatile memory cells. The control circuit is configured to first read a block of non-volatile memory cells using a first setoff read parameters, determine that the first read fails to successfully read the block of non-volatile memory cells, second read the block of memory cells using a second set of read parameters different from the first plurality of read levels, determine that the second read successfully reads the block of non-volatile memory cells, predict that the first read failed because of read disturb, and re-write data to the block of non-volatile memory cells.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

The invention claimed is:

1. An apparatus comprising:
a memory structure comprising non-volatile memory cells;
a control circuit coupled to the memory structure, the control circuit configured to:
first read a block of non-volatile memory cells using a first plurality of read levels;
determine that the first read fails to successfully read the block of non-volatile memory cells;
second read the block of memory cells using a second plurality of read levels different from the first plurality of read levels;
determine that the second read successfully reads the block of non-volatile memory cells;
estimate that the first read failed because of data retention or read disturb; and
erase and re-write data to the block of non-volatile memory cells.

2. The apparatus of claim 1, wherein the first read levels comprise default read levels.

3. The apparatus of claim 1, wherein the second read levels comprise re-tuned read levels.

4. The apparatus of claim 1, wherein:
the first plurality of read levels comprises a first read level and a second read level;
the second plurality of read levels comprises a third read level and a fourth read level; and
the control circuit is configured to estimate that the first read failed because the block of memory cells comprises data retention or read disturb greater than a predetermined amount by:
determining that a first difference between the first read level and the third read level is greater than a first threshold or determining that a second difference between the second read level and the fourth read level is greater than a second threshold.

5. The apparatus of claim 4, wherein:
the first read level and third read level each comprise a highest read level; and
the second read level and the fourth read level each comprise a lowest read level.

6. The apparatus of claim 4, wherein:
the block of non-volatile memory cells comprises a plurality of programmed states;
the first read level and the third second level each correspond to a first one of the programmed states; and
the second read and the fourth read level each correspond to a second one of the programmed states.

7. The apparatus of claim 4, wherein:
the block of non-volatile memory cells comprises a highest programmed state and a lowest programmed state;
the first read level and the third second level each correspond to the highest programmed state; and
the second read and the fourth read level each correspond to the lowest programmed state.

8. The apparatus of claim 1, wherein the control circuit is further configured to immediately erase and re-write data to the block of non-volatile memory cells.

9. The apparatus of claim 1, wherein the control circuit is further configured to flag the block of non-volatile memory cells and erase and re-write data to the block of non-volatile memory cells as a background operation.

10. The apparatus of claim 1, wherein the memory structure comprises a three dimensional array of non-volatile memory cells.

11. The apparatus of claim 1, wherein the non-volatile memory cells comprise NAND strings.

12. A method comprising:
   first reading a block of non-volatile memory cells using default read levels;
   determining that the first read failed to successfully read the block of non-volatile memory cells;
   re-tuning the first read levels to determine re-tuned read levels each associated with a corresponding default read level;
   second reading the block of non-volatile memory cells using the re-tuned read levels;
   determining a first difference between a first default read level and a corresponding first re-tuned read level;
   predicting based on the first difference that the first read failed because of data retention or read disturb; and
   re-writing data to the block of non-volatile memory cells.

13. The method of claim 12, further comprising re-writing data to the block of non-volatile memory cells without first erasing the block of non-volatile memory cells.

14. The method of claim 12, wherein the first default read level is associated with a highest programmed state of the block of non-volatile memory cells.

15. The method of claim 12, further comprising:
   determining a second difference between a second default read level and a corresponding second re-tuned read level; and
   predicting that the first read failed based on the first difference or the second difference.

16. The method of claim 15, wherein the second default read level is associated with a lowest programmed state of the block of non-volatile memory cells.

17. The method of claim 15, further comprising erasing the block of memory cells prior to re-writing data to the block of non-volatile memory cells.

18. The method of claim 12, further comprising immediately re-writing data to the block of non-volatile memory cells.

19. The method of claim 12, further comprising flagging the block of non-volatile memory cells and re-writing data to the block of non-volatile memory cells as a background operation.

20. Apparatus comprising:
   a plurality of non-volatile memory cells;
   a control circuit coupled to the non-volatile memory cells, the control circuit configured to:
      first read a block of non-volatile memory cells using a first setoff read parameters;
      determine that the first read fails to successfully read the block of non-volatile memory cells;
      second read the block of memory cells using a second set of read parameters different from the first plurality of read levels;
      determine that the second read successfully reads the block of non-volatile memory cells;
      predict that the first read failed because of read disturb; and
      re-write data to the block of non-volatile memory cells.

* * * * *